(12) United States Patent
Zou et al.

(10) Patent No.: US 11,483,340 B2
(45) Date of Patent: Oct. 25, 2022

(54) SYSTEM FOR MALICIOUS HTTP TRAFFIC DETECTION WITH MULTI-FIELD RELATION

(71) Applicant: SHANGHAI JIAOTONG UNIVERSITY, Shanghai (CN)

(72) Inventors: Futai Zou, Shanghai (CN); Chengwei Zhang, Shanghai (CN); Yue Wu, Shanghai (CN); Kaida Jiang, Shanghai (CN); Siyu Zhang, Shanghai (CN); Linsen Li, Shanghai (CN); Xinghao Jiang, Shanghai (CN); Dawu Gu, Shanghai (CN)

(73) Assignee: SHANGHAI JIAOTONG UNIVERSITY, Shanghai (CN)

( * ) Notice: Subject to any disclaimer, the term of this patent is extended or adjusted under 35 U.S.C. 154(b) by 507 days.

(21) Appl. No.: 16/741,692

(22) Filed: Jan. 13, 2020

(65) Prior Publication Data
US 2021/0218754 A1 Jul. 15, 2021

(51) Int. Cl.
*H04L 9/40* (2022.01)
*H04L 67/02* (2022.01)
*G06F 17/16* (2006.01)
*G06F 17/18* (2006.01)
*G06N 20/10* (2019.01)

(52) U.S. Cl.
CPC ............ *H04L 63/145* (2013.01); *G06F 17/16* (2013.01); *G06F 17/18* (2013.01); *G06N 20/10* (2019.01); *H04L 67/02* (2013.01)

(58) Field of Classification Search
CPC ....... H04L 63/145; H04L 67/02; G06N 20/10; G06F 17/16; G06F 17/18
See application file for complete search history.

(56) References Cited

U.S. PATENT DOCUMENTS

2017/0195353 A1* 7/2017 Taylor ................. H04L 63/1425
2017/0262629 A1* 9/2017 Xu ........................... G06F 21/56
2017/0264626 A1* 9/2017 Xu ......................... H04L 63/145

FOREIGN PATENT DOCUMENTS

CN 103840983 A * 6/2014

* cited by examiner

*Primary Examiner* — Arvin Eskandarnia
(74) *Attorney, Agent, or Firm* — Dragon Sun Law Firm, PC; Jinggao Li; Nathaniel Perkins

(57) ABSTRACT

The present disclosure provides a detection system, comprising a client for unloading malicious HTTP traffic and a server for receiving and detecting the malicious HTTP traffic, wherein the server comprises an active label corrector for correcting noisy labels of the malicious HTTP traffic and a multi-field feature extractor for automatically discovering underlying features of the malicious HTTP traffic.

10 Claims, 2 Drawing Sheets

SYSTEM FOR MALICIOUS HTTP TRAFFIC DETECTION WITH MULTI-FIELD RELATION

TECHNICAL FIELD

The present disclosure belongs to the technical field of information security and relates to a detection system for detecting malicious HTTP traffic.

DESCRIPTION OF RELATED ART

The Hyper Text Transfer Protocol (HTTP) is the de-facto protocol for realizing desktop and mobile websites as well as applications. Traffic shares of more than 50%, e.g., in a residential access link, an IX, or backbone, express this dominance. Since the popularity and broad applications of HTTP, which makes attackers easier to hide among the large amount of HTTP traffic, it has already become the main media for illicit activities such as drive-by downloads, phishing, botnet command and control (C&C), click frauds and so forth. Furthermore, cyber criminals also have developed a variety of techniques to evade possible detection. For example, a fast-flux service allows cyber criminals to quickly change the IP address of malicious domain to avoid IP-based access control. A polymorphism trick allows cyber criminals to dynamically change the user-agent strings to bypass the common signature-based detection system.

Existing approaches of detection for malicious HTTP traffic can be roughly divided into two categories according to the way in which features are designed: (1) manually-designed methods: groups of statistic-based multi-field related feature sets are used to detect the anomaly. To exploit the structural information, designs a message-tree to generate signatures merely from malicious traffic via cluster-based methods. Fingerprints extracted from multi-field (host, constant request header fields, average size, user agent, language and outgoing information) are passively generates to describe the network behavior of an application. As single field also plays a critical role in HTTP, such as Uniform Resource Locator (URL). There are also methods focusing on extracting lexical features to identify malicious URL. Similarly, malicious traffic is detected by mining the error patterns of status code, which is a specific field of HTTP. (2) auto-learned methods: In contrast to URL, network traffic data also suffer from the unavoidable difficulties of label noise and non-stationarity, making the auto-learned features be vulnerable to labels. Consequently, the existing auto-learned methods mainly focus on the detection of malicious URL. A group of Convolutional Neural Networks (CNNs) are applied to model both characters and words of the URL String with an embedding 60 layer in a jointly optimized framework.

These traditional techniques have been successful in identifying malicious traffic within networks. However, there are two problems with these techniques. Firstly, the success of manually-designed features is limited because the course of effective feature mining and selecting, called feature-engineering, is expensive and it is inflexible to determine the most useful features under different applications. Subversively, researchers have to seek extra features due to an upgrade from version HTTP/1.0 to HTTP/1.1, or HTTP/1.1 to HTTP/2.0. Secondly, for the existing auto-learned features, even for most manually-designed features, focus on single field (e.g. URL, 72 status code) or multi-field content, the underlying trigging relation among fields (e.g. relation between URL and referer, version and method) are not concerned. Consequently, attackers or malwares can easily evade the detection by deploying a normal URL or other specific fields. The difficulty to solve these problems lies in that 1) the relation between multi-field is inexplicit and highly non-linear, causing obstacles to manually design understandable features; 2) the unstructured network traffic data and the unavoidable noisy labels place deep learning based methods in a bad training environment; 3) multi-field analysis will introduce flooding trivial information. For example, URLs are often more informative than most the other fields like method, version or language. How to exclude trivial information is still an open problem.

SUMMARY

In view of the above defects of the prior art, the technical problem to be solved by the present disclosure is to provide a system to detect malicious HTTP traffic using auto-designed and multi-field aware features.

In order to achieve above purpose, the present application provides a detection system, comprising a client for unloading malicious HTTP traffic and a server for receiving and detecting the malicious HTTP traffic, wherein the server comprises an active label corrector for correcting noisy labels of the malicious HTTP traffic and a multi-field feature extractor for automatically discovering underlying features of the malicious HTTP traffic.

In a preferred embodiment, the system further comprises a field segmentor for dividing the different fields of the malicious HTTP traffic into structure fields and restrained fields and segmenting the different fields into uniform formats.

In a preferred embodiment, the structure fields comprises host, URI, referrer and user-agent, and the restrained fields comprises method, version, request and response content-type, and response status code.

In a preferred embodiment, the active label corrector is configured to use a SVM-based label correction algorithm to correct the noisy labels.

In a preferred embodiment, the active label corrector is configured to have the functions of:
(1) using a URI field to construct a corpus set;
(2) getting the dictionary size of the corpus set;
(3) initializing an embedding matrix, and creating a word2vec model using training samples in datasets to train the matrix;
(4) obtaining the average value of each sample by averaging the position of each sample in the embedding matrix;
(5) creating an empty SUP set;
(6) creating an empty NSUP set;
(7) creating a first SVM model using all samples in the datasets;
(8) separating the support vectors of the first SVM model from the dataset and add them to SUP set and add the rest to NSUP set;
(9) creating a second SVM model using the samples in NSUP set;
(10) testing the samples in SUP set using the second SVM model and re-ranking the mislabeled samples based on their probability;
(11) checking the previously unseen samples in SUP set based on the ranking obtained in Step (9), and correcting the corrupted labels in the dataset; and
(12) repeating the Steps (6) to (12) until all the noise samples are adjusted.

In a preferred embodiment, the multi-field feature extractor comprises a hybrid network for discovering the underlying relation among fields and reducing the trivial information and improving interpretability.

In a preferred embodiment, the multi-field feature extractor comprises a field embedding module for transforming plain texts into numeric output through a trainable matrix.

In a preferred embodiment, the multi-field feature extractor comprises an inception block, which is composed of convolutional filters and a max pooling operation for extracting different size of context patterns.

In a preferred embodiment, the hybrid network comprises a multi-layer cross network for automatically searching effective features and an attention network for relieving the trivial information and trying to automatically discover the important parts of different fields and gather them together.

In a preferred embodiment, the hybrid network is configured to be trained by supervised multi-field feature extraction samples.

In a preferred embodiment, the system further comprising an explainable predictor for presenting an interpretable report.

The present disclosure has the following contributions. The malicious network traffic detection problem is redefined from a free feature-engineering perspective of the pipeline of ALC and MFE, called AutoHTTP. It is the first to exploit the relationships among HTTP fields via deep learning. An Attention and Cross Network which fully gets rid of the manually-designed features is used and results from it are still interpretable. Though solely considered HTTP traffic here, these frameworks can be easily applied to other multi-field protocols. Experiments demonstrate that this model outperforms the existing models and has enough robustness to resist certain random noise.

In the following contents, the concept, specific structure and technical effect of the present disclosure will be further described in combination with the drawings, so as to fully understand the purpose, features and effect of the disclosure.

DETAILED DESCRIPTION

Figure 1:
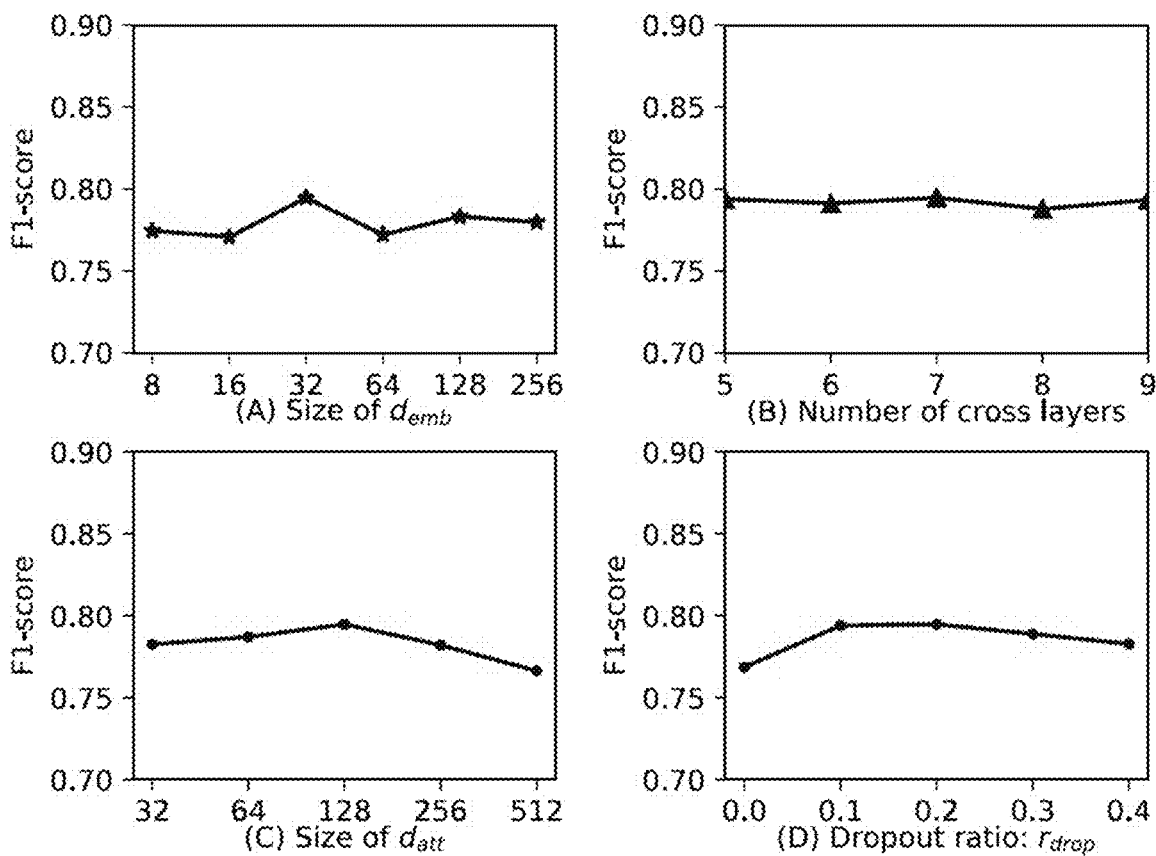
FIG. 1 is a schematic diagram showing the performance of the model with different parameters in a preferred embodiment of the present disclosure.

Several preferred embodiments of the present disclosure are described with reference to the drawings of the specification, so that the present disclosure is clearer and easier to be understood. The present disclosure can be realized by many different forms of embodiments, and the protection scope of the present disclosure should not be limited to the embodiments mentioned herein.

In the drawings, the same components are represented by the same reference numbers, and the components with similar structure or function are represented by the similar reference numbers. The size and thickness of each component shown in the drawings are arbitrarily shown, and the present disclosure does not limit the size and thickness of each component. In order to make the drawings clearer, the thickness of the parts is appropriately exaggerated in some places in the drawings.

The present disclosure provides a detection system for detecting malicious HTTP traffic using auto-designed and multi-field aware features. To conquer the above dilemma, the malicious network traffic detection problem is redefined into 2 steps from a free feature-engineering perspective: Step 1: Active Label Correction (ALC) to remove the noisy labels. Step 2: Multi-field Feature Extraction (MFE) to automatically discover the underlying features. Specifically, a SVM-based label correction algorithm is used to correct the label noise. To address the problems of unstructured fields, different fields are divided into two categories: Structure fields (S-fields) and Restrained fields (R-fields). Each field is preprocessed according to these two categories. Then, a hybrid network called Attention and Cross (A&C) network is proposed to: 1) discover the underlying relation among fields and 2) reduce the trivial information and improve interpretability. For one thing, the relations between different fields can introduce higher-level semantics and require more efforts for attackers to evade the detection. For the other, trivial information will overshadow the effective features and the interpretability is important to explain the decision. To exploit the relation between HTTP fields, a multi-layer cross network is introduced to automatically searching effective features, including the correlation features, which are denoted as crossing features. Then, an attention network is used to relieve the trivial information and try to automatically discover the important parts of different fields and gather them together, which is denoted as attended features. This part can also improve the system interpretability by outputting the normalized attention weights of different fields. Hence, by combing the results of two networks, the correlation features among all fields are extracted and concatenated with a comprehensive and informative attended-field. Then a residual block is applied to further exploit the inexplicit and highly non-linear semantic features among the crossing features and attended features.

HTTP is an application layer protocol consisting of requests and responses. HTTP gives the details of networking to the universal, reliable transport control protocol TCP, so it ensures that data is not corrupted or confusing during transmission, and users do not need to worry about their integrity when accessing information.

HTTP request headers are typically in plain-texts. The HTTP request of a flow is composed of three parts: request line, request header, and request body. The request line and request header are encoded by ASCII characters. A HTTP request header is an ensemble of structured fields. Encoding type of the HTTP body is determined by the specific content it carries. Thus the body information is not introduced into each flow. In addition, Cookie for privacy concerns is not introduced too. Several important request fields are listed as below.

Request Method: HTTP defines a set of methods called security methods, like POST, GET. Host: Indicates the domain name of the server and the port number that the server is listening on.

Request URL: The syntax of most URL associations is based on the general format of the following nine parts: [scheme]: //[user]:[password]@ [host]:[port]/[path]; [parameters]? [query]#[fragment] Scheme and host are indispensable parts for a legal request after HTTP/1.1.

Referer: Represents the previous page accessed by the browser, which can be thought of as a link to the previous page that brought the browser to the current page.

User-Agent: Browser identity string.

Since the method in the present disclosure can also deal with response headers, several response fields are also listed as examples:

Status code: Used to tell the client what has happened. Different status codes can be classified by a three-digit code. A status code between 200 and 299 indicates success. A status code between 300 and 399 indicates that the resource has been removed. A status code between 400 and 499 indicates that the client's request has gone wrong. A status code between 500 and 599 indicates that the server is down.

Response Content-Type: Indicating what MIME type the following document belongs to.

Note that the HTTP headers in the present disclosure would indicate both request and response headers if not specified. It has to mention that though HTTPS had been proposed by utilizing the TLS to encrypt the HTTP traffic for a safer communication, the present disclosure focuses on HTTP traffic mainly for three reasons: 1) according to the latest report from Google, 80.2% of unencrypted HTTP traffic are from mobile devices due to the compatibility of new standard and approximately over 75% of all devices connected to the Internet will be mobile devices in 2019; 2) switching to HTTPS would harm the cyber criminals' revenues due to problems with signed certificates, thus majority of malware communication is still over HTTP protocol; 3) more cause for concern is that it may be possible to infer the HTTP method, status-code, and other fields without decrypting the connection, therefore it is possible to infer malicious HTTPS traffic using HTTP-based method.

The architecture of the detection system comprises the components as below.

The first one is field segmentor for classifying multiple fields into two categories: R-Field and S-Field. Then, fields in different categories are segmented into uniform formats with specific methods. The second one is active label corrector. This component is mainly designed to correct the noisy labels using SVM-based ALC algorithm. The third one is multi-field feature extractor for extracting multi-field features, especially the relationships and attended features. An attention and cross network is proposed to learn the feature interactions and attention weights simultaneously. Then fusion part is applied to further exploit the inexplicit and highly non-linear semantic information among crossing features and attended features. The fourth one is predictor. After optimizing the entire multi-field feature extractor, the model can be deployed to predict (detect) incoming samples. Importantly, this model can not only detect the malicious samples, but also present an interpretable report, which is auxiliarily produced from the outputs of attention part without further cost.

Details of the components are provided as below.

Fields can be classified into two categories according to whether the alternative words are restrained. For example, words in method field can only choose from 'POST', 'GET', 'HEAD' and so on, totally 3 in HTTP/1.0 and expanded to 8 in HTTP/1.1. On the contrary, words in URL field have no restrictions on length and options, while they shows certain structure information as mentioned in Section II-A. Here the restrained fields are termed as R-Field and the rest fields as S-Field (structure field). For simplicity, 9 fields are selected, including 4 S-fields: host, URI, referer, user-agent and 5 R-fields: method, version, request and response content-type, and response status code.

In order to obtain structure features inside S-field, previous works have shown that URL contained in HTTP header can be segmented using several special separators. This framework starts with generating word segmentations from the raw traffic for each S-field, which would serve as inputs for the model.

Formally, given a raw HTTP header with a S-field size of Ks, this method generates a set of word segmentations $W_k = \{w_i\}_{i=1}^{M}$, where M denotes the maximum sequence length in the $K_s^{th}$ field using the separators such as #, ?, ;, / and so on. These segmentations here are not meaningless, on the contrary, incorporate a number of semantically rich fragments, such as query key and value. After the segmentation operation, all these segmentations are merged from different samples and obtain a corpus set $C_s = \cup_{i=1}^{N} \{w_{jk}\}_{i,j \leq M, k \leq K_s}$, where N is the number of training samples, Vs is the size of this corpus set, Ks is the size of S-fields. Similarly, $C_r = \cup_{i=1}^{N} \{w_k^i\}_{i,k \leq K_r}$, where Kr is the size of R-fields, Vr is the size of this corpus set. To save space and memory, a threshold T is set for the corpus and those word frequency is less than the threshold will be reset as a new token (e.g. UNK), which means that these words are not commonly used, and such rarity may have high possibility to be malicious. In addition, since DNNs must take uniform length as input, this model pad or truncated the fields until their lengths reach M.

If the features are moderate, when support vector machine (SVM) finds an example difficult to discriminate, one which they are likely to be mislabeled, it is likely to be a support vector itself or samples nearby support vectors. Also, if an attacker wants to evade detections by changing label distribution, it will be beneficial for them to focus on the support vectors.

Since URL contains rich semantic information of the traffic, many existing works, for convenience, focus only on identifying malicious URL, indicating that URL is essential to malicious traffic detection and motivating us to treat URL as the training data of SVM.

However, it turns out that machine learning algorithms are incapable of processing strings or plain text in their raw form. They require numbers as inputs to perform any sort of job, be it classification, regression etc. To solve the problem, multiple word embedding algorithms have been proposed, such as count vector, TF-IDF vector or co-occurrence matrix. These methods proved to be limited in their word representations until Word2vec is introduced to the NLP (Natural Language Processing) community. Accordingly, this model first proposes an URL-embedding algorithm, described in following Table 1, to turn the raw URLs into numerical representations with as little loss of information as possible.

Then, n Active Label Correction algorithm is introduced based on the URL embeddings, described in following Table 2, to clean the noisy samples using the support vectors of SVM.

TABLE 1

Embedding for URLs

Input: : The set of segmented URL sequences $\vec{u}_i =$
       $[u_1, u_2, \ldots, u_M]$, the size training samples N, the window
       size w, the word frequency threshold T, the embedding
       dimension of Word2vec E.
Output: : the embedding vectors of the URLs
  1:    Given segmented word sequences $\vec{u}$ and the word
        frequency threshold T, construct the corpus set $C_u =$
        $\cup_{i=1}^{N} \{v_{ij}\}_{i,j \leq M}$, those word frequency less than T will
        be reset as a special token.
  2:    V = dictionary size of corpus set $C_u$
  3:    Initialize the embedding matrix $M_{emb} \in \mathbb{R}^{V \times E}$ with 0
        mean and standard deviation 0.1 and create Word2vec
        model using all samples in the datasets to train the matrix
        with window size w TABLE 1-continued Embedding for URLs 4:
$$\vec{u} = \frac{1}{M}\sum_{1}^{M}\vec{u_i},$$

where $\vec{u_i} \in \mathbb{R}^E$ belongs to the subspace of $M_{emb}$

TABLE 2

Active Label Correction for HTTP traffic

Input: : The set of URL vectors $\vec{u_i} \in \mathbb{R}^E$ belongs to the subspace of $M_{emb}$, target label p.
Output: : Corrected HTTP traffic
1:    Create an empty set: SUP_SET
2:    Create an empty set: NSUP_SET
3:    Create SVM model$_1$ with $\vec{u}$ and p using all samples in the datasets
4:    Separate the support vectors of SVM model$_1$ from the dataset and add them to SUP_SET and add the rest to NSUP_SET
5:    Create SVM model$_2$ using the samples in NSUP_SET
6:    Test the samples in SUP_SET using the SVM model$_2$ and re-rank the mislabeled samples based on their probability
7:    Have an expert (e.g. Anti-Virus engines, Virustotal) to check the previously unseen samples in SUP_SET based on the ranking obtained in Step 6. correct the corrupted labels in the dataset
8:    Repeat the Steps 2 to 8 until all the noise samples are adjusted.

Given a specific field of word segmentations sequence $\vec{W}_{k_s} = \{w_1, w_2, \ldots, w_M\}$, $w_m \in C_s$, which are extracted from the $K_s^{th}$ S-Field of a raw HTTP flow header by field segmentation, the purpose of field embedding is to transform the plain text into numeric output through a trainable matrix, called embedding matrix.

Formally, the word vector representation $\vec{w}_{embed,m} \in \mathbb{R}^{d_{emb}}$ can be obtained from a uniformly randomized embedding matrix $M_S \in \mathbb{R}^{V_s \times d_{emb}}$. Next, these word vectors are combined to create field matrix representation as follows, $$W_{embed,k_s} = \{\vec{w}_{embed,1}, \vec{w}_{embed,2}, \ldots, \vec{w}_{embed,M}\} \in \mathbb{R}^{M \times d_{emb}}$$

where $d_{emb}$ is the dimension of word embedding space.

Simultaneously, the same operations are also done for R-Field, another embedding matrix $M_R \in \mathbb{R}^{V_r \times d_{emb}}$ is randomized and the difference is that R-field representation combines the segmented word vectors as an average vector, $$\vec{w}_{embed,k_r} = \text{Average}\{\vec{w}_{embed}\} \in \mathbb{R}^{d_{emb}}$$

because most R-fields only contain one word, rarely more than two words, indicating no context information to be further exploited.

To exploit the context features from S-Fields, a parameter-shareable inception block is performed on the sequences for the purpose of feature extraction. Concretely, 3 types of convolutional filters $W \in \mathbb{R}^{d_{emb} \times h}$, h=1, 3, 5, with $n_{inc}$ filters and $d_{emb}*3$ max pooling are used to extract different size of context patterns, where $n_{inc}$ is a hyper parameter on behalf of number of filters. The results are concatenated and followed by an average pooling layer for dimension reduction. Note that the inception block is repeated for once and shared by all S-fields. Accordingly, $\vec{w}_{embed,k_s}^{inc} \in \mathbb{R}^M$ is obtained as outputs. In order to unify the vector space, a parameter-shareable fully connected is applied to the vectors of R-field, denoted as, $$\vec{w}_{embed,k_r}^{fc} = f(W_h w_{embed,k_r} + b_h)$$

where $W_h \in \mathbb{R}^{M \times d_{emb}}$, $b \in \mathbb{R}^M$, $f(\bullet)$ is the activation function. Finally, the vectors from S-fields and R-fields are integrated into one vector X, denoted as, $$X = [\vec{w}_{embed,1}^{inc}, \ldots, \vec{w}_{embed,K_s}^{inc}, \vec{w}_{embed,1}^{fc}, \ldots, \vec{w}_{embed,K_r}^{fc}]$$

where the total field size K=Ks+Kr. Here X is termed as Multi-Field Feature Representations, and can be thought as the elementary representation of HTTP field segmentation.

Although the Multi-Field Feature Representations can directly be applied to detect malicious HTTP traffic to some extent, it is still unsatisfactory to handle complex detection tasks due to two key factors as below.

The first one is Implicit and Inefficient Feature Representation. On one hand, the manually crafted features are often explicit and effective while the features learned by DNNs are implicit and highly nonlinear. On the other hand, as the number of fields increases, there is no doubt the parameters of fully connected layers will increase quickly as well. Therefore, it is necessary to design a model that is able to learn low-degree feature interactions more efficiently and explicitly than a universal DNN.

The second one is Information Obfuscation: In contrast to the algorithms based on handcrafted features that almost all features make a concrete contribution to the final decision and those invalid ones have been removed manually. The algorithm takes raw HTTP traffic as inputs and the features are automatically generated for all fields without any selection. Some fields may have no obvious effects on final prediction while other fields (like URL) may have great contributions. Without any guidance, the network will inefficiently pay the same attention o all fields or in the worst case, flooded by trivial information and obscuring noise, fail to identify the most valid fields.

For the first problem of Implicit and Inefficient Feature Representation, the cross network from Deep & Cross Network has been introduced to mine explicit feature interactions in an efficient way. Specifically, the cross network is composed of multiple cross layers, with each layer feeding forward as follows:

$$X_{l+1} = X_0 X_l^T w_l + b_l + X_l = f(X_l, w_l, b_l) + X_l$$

where $X_l$, $X_{l+1}$ are the outputs from the $l^{th}$ and $(l+1)^{th}$ cross layers, respectively; $X_{l=0}$ is defined as the flatten X at the first layer; $w_l$, $b_l \in \mathbb{R}^{M \cdot K}$ are the weight and bias parameters of the $l^{th}$ layer. Each cross layer adds back its input after a feature interaction mapping function f: $\mathbb{R}_{M \cdot K} \rightarrow \mathbb{R}^{M \cdot K}$, which fits the residual of $X_{l+1} - X_l$, making information propagation smooth when the network goes deeper.

Intuitively, each cross layer transforms all the pairwise interactions between X and $X_l$ efficiently, back to the input's dimension. Consider the input $\tilde{X} \in \mathbb{R}^{M \cdot K}$, let $X_l = [x_1, x_2, \ldots, x_{M \cdot K}]^T$. Firstly, the cross layer constructs $(M \cdot K)^2$ pairwise interactions $x_i \tilde{X}_j$. After that, it implicitly transforms hem back to dimension M·K in a space-efficient way, generating sufficient high-degree crossing features. The cost of the cross layer is linear in dimension M·K.

For the second problem of Information Obfuscation, an attention network is used to redistribute the importance of each input field and to generate a heuristical representation. Intuitively, these fields are not all relevant to the label and we could learn an attention weight to highlight the discriminative fields and suppress the obscuring fields.

Formally, for each field, let $X=[X_1, X_2, \ldots, X_K]^T$, and learn this attention weight with a linear transformation:

$$X_t^s = W_{a,o} f(W_{a,h} X_t + b_{a,h}), t = 1, 2, \ldots, K$$

$$\lambda_t = \frac{\exp(X_t^s)}{\sum_{t=1}^{K} \exp(X_t^s)}$$

where $W_{a,o} \in \mathbb{R}^{1 \times d_{att}}$, $W_{a,h} \in \mathbb{R}^{d_{att} \times M}$, $b_{a,h} \in \mathbb{R}^{d_{att}}$ are the trainable parameters for the hidden transformation layer and output layer, respectively; and f( ) is the activation function (here ReLU is used). Accordingly, the attended field representation, denoted by X, corresponds to an attention weighted field average pooling, which is given by $$\overline{X} = \sum_{t=1}^{K} \lambda_t X_t$$

where $\lambda = (\lambda_1, \ldots, \lambda_K)$ is a vector of the scalar outputs from the softmax function to normalize the outputs. Then a residual block is applied to learn highly nonlinear attended features.

Finally, to further exploit the inexplicit and non-linear semantic features among the crossing features and attended features, a combination layer concatenates the outputs from two networks and feed the concatenated vector into another residual block to obtain the final HTTP-based network traffic representation, as follows:

$$X_{Final} = f([X_a, X_c])$$

where f is a residual block, then a standard logits layer is performed to make the prediction using the efficient and powerful representation vector.

$$p = \sigma(X_{Final}^T w_{logits})$$

here, $w_{logits} \in \mathbb{R}^{n_{Final}}$ is the weight vector for the prediction layer, and $\sigma$ is the standard sigmoid function.

To optimize the whole network, the loss function consists of a binary classification loss and regularization loss, as follows:

$$L_{overall} = L_{cls} + \beta L_{reg}$$

where $L_{reg}$ is the L2 regularization term to prevent overfitting and $\beta$ is set to $10^{-5}$. The classification loss can be denoted as follows:

$$L_{cls}(y, p) = -\frac{1}{n}\left(\sum_{i=1}^{n} \alpha^+ y_i \log(p_i) + \sum_{i=1}^{n} \alpha^- (1 - y_i) \log(1 - p_i)\right)$$

where n is the number of training samples. Let $n^+ = \Sigma y_i$ and $n^- = n - n^+$, and set $$\alpha^+ = \frac{n}{n^+} \text{ and } \alpha^- = \frac{n}{n^-},$$

which are used for balancing the effect of positive and negative samples during training.

The following disclosure is provided for evaluating the framework for HTTP-based malicious traffic detection.

The datasets of CTU-13, CICAndMal and ISCX-URL are used.

The CTU-13 is a dataset of botnet traffic that was captured in the CTU University, Czech Republic, in 2011, which consists in a group of 13 different malware captures done in a real network environment with totally 20,643,076 network flows, only 369,806 labeled. After filtering the traffic, the number of effective HTTP flows is 116,192. This dataset is relatively obsolete, compared with other two datasets, fashionable malicious samples are likely not included. Despite that, it still contained plenty of the classic malicious behaviors (e.g spam, click fraud, C&C DDos, etc.), often irreplaceable to considerable detection models. (S. Garcia, M. Grill, J. Stiborek, and A. Zunino, "An empirical comparison of botnet detection methods," computers & security, vol. 45, pp. 100-123, 2014.)

The CICAndMal dataset is a new Android malware dataset, which collected more than 10,854 samples (4,354 malware and 6,500 benign) from several sources. It has collected over six thousand benign apps from Googleplay market published in recent three years. The malware samples in the CICAndMal dataset are classified into four categories: adware, ransomware, scareware, SMS malware, and malicious samples come from unique malware families. All the traffic were collected via running both malware and benign applications on real smart phones to avoid runtime behavior modification of advanced malware samples that are able to detect the emulator environment. The number of effective HTTP flows is 487,981. This dataset is more challenging because (1) it contains large number of the most up-to-date malicious behaviors by 2018; (2) the variety of behaviors is enhanced significantly. (A. F. A. Arash Habibi Lashkari, L. Taheri, and A. A. Ghorbani, "Toward developing a systematic approach to generate benchmark android malware datasets and classification," in International Carnahan Conference on Security Technology. IEEE, 2018.)

The ISCX-URL dataset is a URL dataset released in 2016. The benign URLs were collected from Alexal top websites. Concretely, the URLs were crawled initially and then passed to remove the duplicates. Then the extracted URLs had been further checked through Virustotal to filter the benign URLs. Then malicious URLs were collected from active phishing sites, malware sites and so on. Here, we only use the raw URLs in the datasets without exploiting other information and the total numbers of benign and malicious URLs are 35378 and 33531 respectively. (M. S. I. Mamun, M. A. Rathore, A. H. Lashkari, N. Stakhanova, and A. A. Ghorbani, "Detecting malicious urls using lexical analysis," in International Conference on Network and System Security. Springer, 2016, pp. 467-482.)

The datasets are all network traffic files (PCAPs). Each file is analyzed with Bro to generate a log file, which contains the both HTTP request and response headers and additional meta-data for each data. The HTTP flows log file is extracted according to the default 80 port without further selection.

As for the key parameters of this framework, the word embeddings matrix is randomly initialized between −1.0 and 1.0. Furthermore, dropout of rate $r_{drop} = 0:2$ is applied to regularize the word embeddings. Maximum sequence length M and field size K are set to 200, and 8, respectively. Here the 9 fields include 4 S-fields: host, URI, referer, user-agents and 5 R-fields: method, version, request and response content-type, and response status code. The word embedding size $d_{emb}$, inception filter numbers $n_{inc}$, and $d_{att}$ are set to 32, 256 and 128, respectively. Cross layers are used for all datasets. The whole model can be trained in an end-to-end way, optimized with the Adam algorithm, where the batch size is set to 512, and the initial learning rate is set to 0.001.

Note that all the datasets in this paper are publicly available and preprocessed with the active label cleaning algorithm describe above, the parameters of ALC used for noise removal are set as w=5, T=3, E=50, the implementation of SVM is from open source projects Scikit-learn.

All the models were evaluated via 5-fold cross validation and were evaluated on the basis of Area under the ROC Curve (AUC) (due to the imbalanced nature of the datasets), accuracy, recall, precision and F1-Score (or F-Measure).

To evaluate the importance of different hyper-parameters, 4 variations of this model are built to measure the changes in performance on CICAndMal dataset with F1-score in FIG. 1

The original model is parameterized by the default parameters mentioned above. Here the five-fold cross validation is used to evaluate the performance.

The first one is Variations of feature extractors. The dimension of word embeddings is varied, keeping the amount of other hyper-parameters. Results show that increasing the dimension of word embeddings to a moderate value is important, too large value will hurt the model quality. This suggests that bigger models are powerful and may also be easy to over-fitting (e.g word embeddings). Further measures should be taken to avoid the problem.

The second one is Variations of the cross network. The number of cross layers is varied and stable results is observed, demonstrating the stability and compatibility of the architecture.

The third one is Variations of the attention network. The dimension of attention layer is varied and it is observed that larger attention is consistently worse than the best setting. Larger attention layer may amply the negative effects of the over-fitting problem from the word embeddings.

The fourth one is Variations of regularization. Dropout is applied to the word embeddings to avoid the over-fitting. The dropout ratio is varied and it is found that the performance will drop off seriously when $r_{drop}$=0 and a moderate rate of 0.2 is beneficial.

Since noisy labels are an inevitable problem with network traffic data, it is still not clear how much on earth the noisy labels affect the proposed models or when it is necessary to apply Active Label Correction algorithm. Experimental results are provided to evaluate the extreme capacity of resisting disturbance of this model. Concretely, the label of a fixed percentage is changed randomly from 5% to 100% of training samples in the CICAndMal dataset via 5-fold cross validation, results are evaluated on the basis of Area under ROC Curve (AUC), accuracy, and F1-Score.

Figure 2:
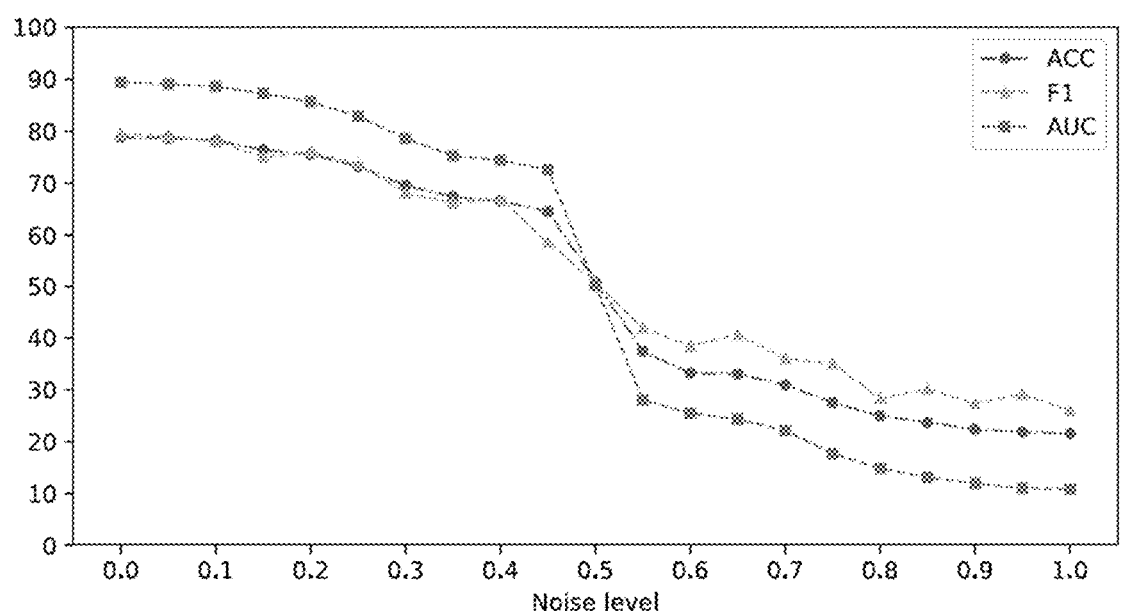
FIG. 2 is a schematic diagram showing the accuracy, F1-Score and AUC of the model when facing a certain percentage of random noisy labels in a preferred embodiment of the present disclosure.

As FIG. 2 shows, on the whole, though the performance of F1-score and accuracy drops slower than that of AUC, the noisy labels affects the AUC performance greatly with the maximum span, which will directly drop the detection rate at very low FPR. Fortunately, it nearly does not affect the performance of all metrics when there are randomly 5% noisy labels. Even at 10%, the model averagely drops about less than 1% performance. Therefore, this deep learning model has a certain capacity of resisting disturbance. It could be implied that the powerful feature representation significantly helped the models resist the noisy labels. Consequently, this investigation could indirectly prove that the multi-field inexplicit semantic characteristic and correlation are powerful features worth to be exploited. Furthermore, the capacity can substantially reduce human labor of correcting noisy labels.

To evaluate the effectiveness of this model on unknown samples, the CICAndMal dataset is divided into four balanced separated subsets according to their malware categories: adware, ransomware, scareware and SMS malware, which are noted as Mal-A, Mal-B, Mal-C and Mal-D, respectively and the number of malicious HTTP flows are 72958, 89379, 45326, 48483. For each subset, 80% of the data is selected randomly as training set and the remaining 20% as testing set. All the models are tested on the testing sets and the experiments are performed five times. Since different types of malwares are essentially different from each other, the behaviors from Mal-B, Mal-C and Mal-D are likely unknown to Mal-A. Thus models trained on Mal-A will have no knowledge about the others and vice versa. Here 4 models on each subset are built with the optimal parameters obtained from cross validation and test them alternately. Detailed results on accuracy are summarized on following Table 3. The result shows that the arise of unknown malware indeed affects the model's detection performance, but this models can still work on most of them. It is observed that the performance on unknown samples are sometimes even better than that on the known samples. For example, result is about 3.5% higher when model is trained on Mal-A and tested on Mal-C or Mal-D. It seems that the performance of 0.6952 goes down on Mal-B, but actually it achieves only 0.6299 when training on Mal-B itself. The observation proves that these models have the strong potential of generalization and can also work well on unknown samples.

TABLE 3

Evaluation of the model on different types of malware classes.

| Test | Train | | | |
|---|---|---|---|---|
| | Mal-A | Mal-B | Mal-C | Mal-D |
| Mal-A | 0.7541 (+/− 0.014) | 0.6582 (+/− 0.016) | 0.7519 (+/− 0.008) | 0.7598 (+/− 0.002) |
| Mal-B | 0.6952 (+/− 0.010) | 0.6299 (+/− 0.016) | 0.7133 (+/− 0.013) | 0.7218 (+/− 0.001) |
| Mal-C | 0.7898 (+/− 0.019) | 0.7129 (+/− 0.011) | 0.8400 (+/− 0.011) | 0.8354 (+/− 0.002) |
| Mal-D | 0.7802 (+/− 0.014) | 0.7082 (+/− 0.009) | 0.8043 (+/− 0.013) | 0.8266 (+/− 0.004) |
| Average | 0.7696 (+/− 0.011) | 0.6807 (+/− 0.009) | 0.7774 (+/− 0.011) | 0.7859 (+/− 0.002) |

Here the MAL-A, MAL-B, MAL-C, and MAL-D refer to adware, scareware, ransomware and sms malware, respectively. Four models are trained for every single malware class and test tem on each class via accuracy.

What is claimed is:

1. A system for malicious HTTP traffic detection with multi-field relation, comprising a client for unloading malicious HTTP traffic and a server for receiving and detecting the malicious HTTP traffic, wherein the server comprises an active label corrector for correcting noisy labels of the malicious HTTP traffic and a multi-field feature extractor for automatically discovering underlying features of the malicious HTTP traffic;

wherein the active label corrector is configured to have the functions of:
- (1) using a URI field to construct a corpus set;
- (2) getting the dictionary size of the corpus set;
- (3) initializing an embedding matrix, and creating a word2vec model using training samples in datasets to train the matrix;
- (4) obtaining the average value of each sample by averaging the position of each sample in the embedding matrix;
- (5) creating an empty Support vector (SUP) set;
- (6) creating an empty non-support vector (NSUP) set;
- (7) creating a first Support Vector Machine (SVM) model using all samples in the datasets;
- (8) separating the support vectors of the first SVM model from the dataset and add them to SUP set and add the rest to NSUP set;
- (9) creating a second SVM model using the samples in NSUP set;
- (10) testing the samples in SUP set using the second SVM model and re-ranking the mislabeled samples based on their probability;
- (11) checking the previously unseen samples in SUP set based on the ranking obtained in Step (9), and correcting the corrupted labels in the dataset; and
- (12) repeating the Steps (6) to (12) until all the noise samples are adjusted.

2. The system for malicious HTTP traffic detection with multi-field relation of claim 1, further comprising a field segmentor for dividing the different fields of the malicious HTTP traffic into structure fields and restrained fields and segmenting the different fields into uniform formats.

3. The system for malicious HTTP traffic detection with multi-field relation of claim 2, wherein the structure fields comprise host, URI, referrer and user-agent, and the restrained fields comprises method, version, request and response content-type, and response status code.

4. The system for malicious HTTP traffic detection with multi-field relation of claim 1, wherein the active label corrector is configured to use an SVM-based label correction algorithm to correct the noisy labels.

5. The system for malicious HTTP traffic detection with multi-field relation of claim 1, wherein the multi-field feature extractor comprises a hybrid network for discovering the underlying relation among fields and reducing the trivial information and improving interpretability.

6. The system for malicious HTTP traffic detection with multi-field relation of claim 5, wherein the multi-field feature extractor comprises a field embedding module for transforming plain texts into numeric output through a trainable matrix.

7. The system for malicious HTTP traffic detection with multi-field relation of claim 6, wherein the multi-field feature extractor comprises an inception block, which is composed of convolutional filters and a max pooling operation for extracting different size of context patterns.

8. The system for malicious HTTP traffic detection with multi-field relation of claim 7, wherein the hybrid network comprises a multi-layer cross network for automatically searching effective features and an attention network for relieving the trivial information and trying to automatically discover the important parts of different fields and gather them together.

9. The system for malicious HTTP traffic detection with multi-field relation of claim 7, wherein the hybrid network is configured to be trained by supervised multi-field feature extraction samples.

10. The system for malicious HTTP traffic detection with multi-field relation of claim 1, further comprising an explainable predictor for presenting an interpretable report.

* * * * *